United States Patent [19]
Carey, II et al.

[11] Patent Number: 5,491,035
[45] Date of Patent: Feb. 13, 1996

[54] COATED METAL STRIP

[75] Inventors: Jay F. Carey, II, Follansbee, W. Va.;
Mehrooz Zamanzadeh, Pittsburgh, Pa.

[73] Assignee: The Louis Berkman Company, Steubenville, Ohio

[21] Appl. No.: 347,261

[22] Filed: Nov. 30, 1994

Related U.S. Application Data

[63] Continuation-in-part of Ser. No. 175,523, Dec. 30, 1993, Pat. No. 5,401,586, which is a continuation-in-part of Ser. No. 154,376, Nov. 17, 1993, abandoned, which is a continuation of Ser. No. 42,649, Apr. 5, 1993, abandoned.

[51] Int. Cl.$^6$ .......................... B32B 15/18; B32B 15/20
[52] U.S. Cl. .................. 428/647; 428/648; 428/658; 428/659; 428/685; 428/939
[58] Field of Search .................................. 426/648, 659, 426/679, 685, 646, 647, 658, 939

[56] References Cited

U.S. PATENT DOCUMENTS

| | | | |
|---|---|---|---|
| 84,205 | 11/1868 | Mills | 428/646 |
| 1,989,925 | 2/1935 | Hoover | 148/6 |
| 2,210,593 | 11/1940 | McCullough | 75/175 |
| 2,258,327 | 10/1941 | Kramer | 29/181 |
| 2,374,926 | 5/1945 | Fink | 117/51 |
| 2,533,048 | 12/1950 | Rodgers | 117/52 |

(List continued on next page.)

FOREIGN PATENT DOCUMENTS

| | | |
|---|---|---|
| 480122 | 4/1992 | European Pat. Off. . |
| 746337 | 5/1933 | France . |
| 1457769 | 9/1966 | France . |
| 2052324 | 3/1971 | France . |
| 2281995 | 8/1974 | France . |
| 2554831 | 5/1985 | France . |
| 2713196 | 10/1978 | Germany . |
| 42-18219 | 9/1967 | Japan . |
| 49-54230 | 5/1974 | Japan . |
| 58-48694 | 3/1983 | Japan . |
| 59-41430 | 3/1984 | Japan . |
| 59-96238 | 6/1984 | Japan . |
| 60-208465 | 10/1985 | Japan . |
| 528558 | 10/1932 | United Kingdom . |
| 546179 | 11/1941 | United Kingdom . |
| 581604 | 10/1946 | United Kingdom . |
| 796128 | 6/1958 | United Kingdom . |
| 1008316 | 10/1965 | United Kingdom . |
| 1040916 | 9/1966 | United Kingdom . |
| 1074852 | 7/1967 | United Kingdom . |
| 1178816 | 1/1970 | United Kingdom . |
| 1194751 | 6/1970 | United Kingdom . |
| 1277523 | 6/1972 | United Kingdom . |
| 1439774 | 6/1976 | United Kingdom . |
| 1513002 | 6/1978 | United Kingdom . |
| 1517454 | 7/1978 | United Kingdom . |
| 2005307 | 4/1979 | United Kingdom . |
| 1588808 | 4/1981 | United Kingdom . |
| 2099857 | 1/1982 | United Kingdom . |
| 2117414 | 10/1983 | United Kingdom . |
| 2265389 | 9/1993 | United Kingdom . |
| 2276887 | 10/1994 | United Kingdom . |

OTHER PUBLICATIONS

Great Britain Search Report dated May 22, 1995, GB 9504712.2.
Max Hansen, Constitution of Binary Alloys, McGraw–Hill Book Co., N.Y., 1958, pp. 1217–1219.
"Tinning of Steel", Robert J. Nekervis & Bruce W. Gonser, pp. 709–711, no date.
"Zinc Coatings", W. M. Peirce, pp. 712–714, no date.
"Zinc and Zinc Alloys", The Zinc Industry, Kelton, E. H., pp. 1077–1086, no date.
"Tin–Zinc Alloy Coatings", Materials & Methods, pp. 1248–1250, Jul. 1946.
Metal Coatings, p. 35, McGraw–Hill Encyclopedia of Scient. & Technology Sixth Edition, vol. II, no date.
Erwin Vogelsang et al., Tin & Tin Alloys, pp. 1063–1070, American Society for Metals—MetalsHandbook, no date.
Higuchi, et al., "Sn–Zn Alloy Electroplated Steel Sheet for Container for Alcohol Fuel or Alcohol—Containing Fuel", Translation of Kokai 58/48690 Mar. 1983, 11 pages.
Federal Specificaiton QQ–T–201F, 12 Nov. 1986, "Terne Plate, for Roofing and Roofing Products" pp. 1–8.
Hot Dip Tin Coating of Steel and Cast Iron, Metals Handbook, 9th Ed., vol. 5, 1983, pp. 351–355, no month.
English Translation of Kokai Patent Application No. SHO 49 (Mar. 1974) 54230.
"Properties and Selection: Nonferrous Alloys and Special–Purpose Materials", Metals Handbook, 10th Ed., vol. 2, pp. 1166–1168, no date.
Standard Specification for Solder Metal; pp. 1 & 9, Nov. 1986.
*Metals Handbook*, The American Society for Metals, "Metallic Coatings", pp. 703–721; Surface Treatments pp. 725–732; Tin and Tin Alloys, pp. 1063–1076; Zinc and Zinc Alloys pp. 1077–1092; 1958, no month.
Van Nostrand's Scientific Encyclopedia, 6th Edition, vol. 1, 1983; pp. 94–96—Definition of "Alloys"; p. 1322—Definition of Galvanizing, no month.
Van Nostrand's Scientific Encyclopedia, 6th Edition, vol. 11, 1983, pp. 2832–2834—Definition of "Tin"; pp. 3059–3062—Definition of Zinc, no month.
McGraw–Hill Encyclopedia of Science & Technology, 6th Edition, 1987, p. 517, no month.
McGraw–Hill Encyclopedia of Science & Technology, 6th Edition, 1987, pp. 35–37; pp. 44–46, no month.
McGraw–Hill Encyclopedia of Science & Technology, 6th Edition, 1987, pp. 368–372 no month.
McGraw–Hill Encyclopedia of Science & Technology, 6th Edition, 1987, pp. 618–623 no month.
Abstract of Great Britain Patent 2,055,158, Feb. 25, 1981.

*Primary Examiner*—John Zimmerman
*Attorney, Agent, or Firm*—Vickers, Daniels & Young

[57] ABSTRACT

A corrosion-resistant architectural material which is essentially lead free and is not highly reflective. The coating on the material is a two-phase metallic coating comprised of zinc and tin. The tin-zinc coating may also include aluminum, antimony, bismuth, copper, magnesium, nickel and/or titanium to improve the coating process and/or improve the properties of the tin-zinc coating.

79 Claims, No Drawings

U.S. PATENT DOCUMENTS

| | | | |
|---|---|---|---|
| 2,703,766 | 3/1955 | Ellis | 117/114 |
| 2,806,622 | 9/1957 | Leirer | 220/5 |
| 3,012,310 | 12/1961 | Godfrey | 29/196.4 |
| 3,058,856 | 10/1962 | Miller | 148/16 |
| 3,231,127 | 1/1966 | Virzi | 220/52 |
| 3,630,792 | 12/1971 | Smyth | 148/6.3 |
| 3,791,801 | 2/1974 | Ariga et al. | 29/196.5 |
| 3,962,501 | 6/1976 | Ohbu et al. | 427/433 |
| 3,966,564 | 6/1976 | Hyner et al. | 204/43 |
| 4,015,950 | 4/1977 | Galland et al. | 428/648 |
| 4,049,481 | 9/1977 | Morisaki | 156/151 |
| 4,177,326 | 12/1979 | Windal et al. | 428/645 |
| 4,184,928 | 1/1980 | Hoije | 204/43 |
| 4,190,504 | 2/1980 | Usui | 204/35 |
| 4,202,921 | 5/1980 | Enghag | 427/406 |
| 4,321,289 | 3/1982 | Bartsch | 427/287 |
| 4,357,027 | 11/1982 | Zeitlow | 280/5 |
| 4,758,407 | 7/1988 | Ballentine et al. | 420/560 |
| 4,778,733 | 10/1988 | Lubrano et al. | 428/647 |
| 4,806,309 | 2/1989 | Tulman | 420/562 |
| 4,814,049 | 3/1989 | Helton et al. | 204/44.2 |
| 4,879,096 | 11/1989 | Naton | 420/561 |
| 4,969,980 | 11/1990 | Yoshioka et al. | 204/28 |
| 4,999,258 | 3/1991 | Wake et al. | 428/632 |
| 5,114,799 | 5/1992 | Wake et al. | 428/632 |
| 5,203,985 | 4/1993 | Nishimura et al. | 205/193 |
| 5,314,758 | 5/1994 | Carey, II et al. | 428/648 |
| 5,354,624 | 10/1994 | Carey, II | 428/647 |

COATED METAL STRIP

This application is a continuation-in-part of prior application Ser. No. 175,523 filed Dec. 30, 1993, now U.S. Pat. No. 5,412,586, which in turn is a continuation-in-part of prior application Ser. No. 154,376 filed Nov. 17, 1993, now abandoned which is in turn a continuation of application Ser. No. 042,649 filed on Apr. 5, 1993, now abandoned.

The present invention relates to the art of metal architectural materials and more particularly to an architectural strip material that is environmentally friendly while providing long life and desired colorization.

INCORPORATION BY REFERENCE

As background material, so that the specification need not specify in detail what is known in the art, Assignees' U.S. Pat. Nos. 4,987,716 and 4,934,120 illustrate metal roofing systems of the type to which this invention can be used and are incorporated herein by reference. U.S. patent application Ser. No. 000,101 filed Jan. 4, 1993, now abandoned illustrating a process of hot-dip coating roofing materials, is also incorporated herein by reference. In addition, various coatings for strip material disclosed in Assignee's U.S. patent application Nos. 042,649 filed Apr. 5, 1993 and 175,523 filed Dec. 30, 1993 are incorporated herein. U.S. Pat. No. 3,231,127 is incorporated herein for purposes of establishing the eutectic point of a tin-zinc alloy.

The present invention relates to the art of coating a metal material and more particularly to the coating of a strip of metal material with a hot-dipped coating of zinc and tin; however, the invention has much broader applications.

BACKGROUND OF THE INVENTION

Over the years, architectural materials, such as metal roofing systems and metal siding systems, made of pliable metals in various sheet gauge thicknesses have been used. Metals such as carbon steel, stainless steel, copper and aluminum are the most popular types of metal. These architectural metal materials are commonly treated with corrosion-resistant coatings to prevent rapid oxidation of the metal surface, thereby extending the life of the materials. A popular corrosion-resistant coating for carbon steel and stainless steel is a terne coating. Terne coating has been the predominate and the most popular coating for roofing materials due to its relatively low cost, ease of application, excellent corrosion-resistant properties and desirable colorization during weathering. The terne coating is an alloy typically containing about 80% lead and the remainder tin. The coating is generally applied to the architectural materials by a hot-dip process wherein the material is immersed into a molten bath of terne metal. Although terne coated sheet metals have exhibited excellent resistant properties and have been used in a variety of applications, the terne coating has been questioned in relation to its impact on the environment. Environmental and public safety laws have been recently proposed and/or passed prohibiting the use of materials containing lead. Because the terne alloy contains a very high percentage of lead, materials coated with terne have been prohibited in various types of usages or applications such as aquifer roofing systems. The concern of lead possibly leaching from the terne coating has made such coated materials inadequate and/or undesirable for several types of building applications. The terne alloy has a further disadvantage in that the newly applied terne is very shiny and highly reflective. As a result, the highly-reflective coating cannot be used on buildings or roofing systems such as at airports and military establishments. The terne coating eventually loses its highly-reflective properties as the components within the terne coating are reduced (weathered); however, the desired amount of reduction takes approximately 1 ½ to 2 years when the terne coating is exposed to the atmosphere, thus requiring the terne metals to be stored over long periods of time prior to being used in these special areas. The storage time is significantly prolonged if the terne-coated materials are stored in rolls and the rolls are protected from the atmosphere.

Tin coating of carbon steel is a well-known process for use in the food industry. However, in the specialized art of architectural materials, a tin coating for architectural materials has not been used until just recently as disclosed in U.S. Pat. No. 5,314,758. The most popular process for applying a tin coating to carbon steel for use in the food industry is by an electrolysis process. In an electrolysis process, the coating thickness is very thin and typically ranges between $3.8 \times 10^{-4}$ to $20.7 \times 10^{-4}$ mm ($1.5 \times 10^{-5}$ to $8.15 \times 10^{-5}$ in.). Furthermore, the equipment and materials needed to properly electroplate the metal materials are very expensive and relatively complex to use. The expense of applying an electroplated-tin coating and the limited obtainable thicknesses of the tin coating are a disadvantage for using such a process for building and roofing materials.

A hot-dip process for applying the tin coating may be used; however, if the architectural materials are not properly prepared and the coating is not properly applied to the roofing materials, minute areas of discontinuity in the tin coating may occur resulting in non-uniform corrosion protection. This is especially a problem when the tin is applied to stainless steel materials by a hot-dip process. Tin is not electroprotective to steel under oxidizing conditions. Consequently, discontinuities in the tin coating result in the corrosion of the exposed metal. Tin coatings have the further disadvantage of having a highly-reflective surface. As a result, architectural materials coated with a tin coating cannot be used in an environment where highly-reflective materials are undesirable until the coated materials are further treated (i.e. painted) or the tin is allowed time to oxidize.

Coating architectural materials with zinc metal, commonly known as galvanization, is another popular metal treatment to inhibit corrosion. Zinc is a highly desirable metal to coat architectural materials with because of its relatively low cost, ease of application (i.e. hot-dip application) and excellent corrosion resistance. Zinc is also electroprotective to steel under oxidizing conditions and prevents the exposed metal, due to discontinuities in the zinc coating, from corroding. This electrolytic protection extends away from the zinc coating over exposed metal surfaces for a sufficient distance to protect the exposed metal at cut edges, scratches, and other coating discontinuities. With all of the advantages of using zinc, zinc coatings have several disadvantages that make it undesirable for many types of building applications. Although zinc coatings will bond to many types of metals, the formed bond is not strong and can result in the zinc coating flaking off the building materials. Zinc does not bond well on standard stainless steel materials. Zinc does not form a uniform and/or thick coating in a hot-dip process for stainless steel. As a result, discontinuities of the coating are usually found on the stainless steel surface. Zinc is also a very rigid and brittle metal and tends to crack and/or flake off when the building materials are formed on site, i.e. press fitting of roofing materials. When zinc begins to oxidize, the zinc coating forms a white powdery texture (zinc oxide). The popular grey, earth tone color is never obtained from pure zinc coatings.

Electroplating a tin and zinc mixture onto a steel sheet is disclosed in Japanese Patent Application No. 56- 144738 filed Sep. 16, 1981. The Japanese patent application discloses the plating of a steel sheet with a tin and zinc mixture to form a coating of less than 20 microns thick. The Japanese patent application discloses that after plating pin hole exist in the coating and subject the coating to corrosion. The pin holes are a result of the crystalline layer of a tin and zinc mixture which slowly forms during the plating process. The charged tin and zinc atoms in combination with the atomic structure of the atoms and formed crystal structure of a tin and zinc mixture prevents a uniform coating from being formed on the plated steel sheet. Consequently, the crystalline depositions must be covered with a chromate or phosphoric acid to fill the pin holes and prevent immediate corrosion. The Japanese patent application also discloses that a preplated layer of nickel, tin or cobalt on the steel sheet surface is needed so that the plated tin and zinc mixture will adhere to the steel sheet. Such electroplating techniques as disclosed in the Japanese patent application cost a tremendous amount of time and money and are not a commercially successful product.

The coating of steel articles with a tin, zinc and aluminum mixture is disclosed in U.S. Pat. No. 3,962,501 issued Jun. 8, 1976. The '501 patent discloses that the tin, zinc and aluminum mixture resists oxidation and maintains a metallic luster. The '501 patent discloses that the coating is applied by immersing a steel article into the molten alloy bath and subsequently withdrawing the steel article. The '501 patent also discloses that a molten tin-zinc alloy bath containing 3–97% zinc is very susceptible to oxidation at the surface thus producing viscous oxides which causes severe problems with the process of immersing the steel articles into the molten alloy and subsequently removing the steel article from the molten alloy. Further, while the steel article is in the molten alloy, a large amount of dross is produced which results in non-uniformity of the coating and formation of pin holes. The '501 patent discloses that the addition of up to 25% aluminum to the tin and zinc mixture inhibits dross formation during immersion of the steel article, prevents Zn-Fe alloy formation and reduces the viscous oxide formation on the molten bath surface. The '501 patent does not teach the use of a continuous, hot dip coating process which resolves the viscous oxide problem and dross formation problem. The '501 patent also discloses the formation of a highly reflective coating which cannot be used in many building applications.

Due to the various environmental concerns and problems associated with corrosion-resistant coatings applied to metal architectural materials, there has been a demand for a coating which can be easily and successfully applied to materials that protect the materials from corrosion, does not have a highly-reflective surface subsequent to application, can be applied by a continuous hot-dip process, weathers to a grey, earth tone color and allows the materials to be formed at the building site.

SUMMARY OF THE INVENTION

The present invention relates to a corrosion-resistant, environmentally friendly coating formulation for use on architectural materials wherein the coating is environmentally friendly, has a low lead content and weathers to form a non-highly-reflective desirable surface which resembles the grey, earth tone color of weathered terne.

In accordance with the principal feature of the invention, there is provided an architectural material typically of stainless steel, carbon steel or copper coated with a tin-zinc alloy. Other materials can also be coated by the tin-zinc coating such as nickel alloys, aluminum, titanium, bronze, etc. The tin-zinc coating is a two phase metal coating primarily comprising zinc and tin. The tin-zinc combination provides for a corrosion-resistant coating that protects the surface of the architectural material from oxidation, which is environmentally friendly thus immune from the prejudices associated with lead containing materials, which forms a gray surface upon weathering which is very similar to weathered terne, and which is not highly reflective.

In accordance with another aspect of the present invention, the tin and zinc content of the tin-zinc alloy makes up at least 75 weight percent of the alloy and preferably makes up to at least 80 weight percent of the alloy and more preferably at least 90 weight percent of the alloy. The zinc content of the alloy is preferably at least 7 weight percent and over 9 weight percent for a two-phase alloy as established in U.S. Pat. No. 3,231,179 and preferably does not exceed about 85 weight percent of the alloy.

In accordance with another aspect of the present invention, the coated metal material is pretreated prior to applying the tin-zinc coating. If the metal material is stainless steel, the pretreatment process is preferably similar to the process disclosed in Assignees' U.S. patent application Ser. No. 000,101 filed on Jan. 4, 1993 and incorporated herein. "Stainless steel" in the application means a large variety of alloy metals containing chromium and iron. The alloy may also contain other elements such as nickel, carbon, molybdenum, silicon, manganese, titanium, boron, copper, aluminum, nitrogen and various other metals or compounds. Elements such as nickel can be flashed (electroplated) onto the surface of the chromium-iron alloy or directly incorporated into the chromium-iron alloy. The pretreatment process includes aggressive pickling and chemical activation of the metal material surface.

Prior to aggressive pickling and chemical activation of the metal material, the metal material may be treated with an abrasive and/or absorbent material and/or subjected to a solvent or other type of cleaning solution to remove foreign materials and oxides from the metal material surface.

The aggressive pickling process is designed to remove a very thin surface layer from the metal material surface. The removal of a very thin layer from the surface of the metal material results in the removal of oxides and other foreign matter from the metal material surface thereby activating the surface prior to applying the tin-zinc coating. When coating stainless steel, it is especially important to activate the stainless steel surface in order to form a strong bonding and uniformly coated tin-zinc coating. The activation of a stainless steel material, as with other metal materials, is accomplished by removing the oxides on the surface of the metal material. The removal of a chromium oxide film from the stainless steel surface activates the stainless steel material surface. Testing of stainless steel materials has revealed that the chromium oxide film interferes with the bonding of the tin-zinc coating and does not allow for thick and/or uniform tin-zinc coatings to be formed. Oxides on other metal materials also adversely effect the bonding and coating thickness of the tin-zinc coating. The aggressive pickling process removes the detrimental oxide layer to facilitate in the formation of a strong bonding and uniform tin-zinc coating.

The aggressive pickling process also may slightly etch the metal material surface to remove a very thin layer of the surface. The rate of etching is not the same throughout the surface of the metal material thereby forming microscopic valleys on the metal material surface which increases the surface area for which the tin-zinc coating can bond to the metal material.

The aggressive pickling process includes the use of a pickling solution which removes and/or loosens the oxide from the metal material surface. The pickling solution contains various acids or combinations of acids such as hydrofluoric acid, sulfuric acid, nitric acid, hydrochloric acid, phosphoric acid and/or isobromic acid. A specially formulated pickling solution should be used if the metal material is stainless steel since the activation of a stainless steel surface is not properly accomplished by use of prior art pickling solutions containing only sulfuric acid, nitric acid or hydrochloric acid. The specially formulated pickling solution contains a special combination of hydrochloric acid and nitric acid. This special dual acid formulation was found to be surprisingly effective in the rapid removal of chromium oxide from stainless steel substrates. The dual acid composition of the pickling solution contains 5–25% hydrochloric acid and 1–15% nitric acid and preferably about 10% hydrochloric acid and 3% nitric acid. The temperature of the pickling solution should be controlled to maintain the proper activity of the pickling solution. The temperature of the pickling solution is generally above 80° F. and usually between 120°–140° F. and preferably 128°–133° F.

The pickling solution may be agitated to prevent the solution from stagnating, varying in concentration and/or to remove gas pockets which form on the metal material surface. The metal material may also be scrubbed during the aggressive pickling process to facilitate in the activation of the metal material surface.

Generally, only one pickling vat is needed to properly activate the metal material surface; however, additional pickling vats may be used. The pickling vats are generally twenty-five feet in length; however, the size of the vat may be longer or shorter. The total time for aggressively pickling the metal material is usually less than 10 minutes, typically less than a minute and preferably about 10 to 20 seconds to properly activate the metal material. If the metal material is a sheet strip and is to be processed in a continuous process, the pickling vats are usually 25 feet in length and the sheet strip is run through the pickling vats at a rate usually between 1–150 ft/min and typically between 50 to 115 ft/min thereby subjecting the metal material to the pickling solution in each pickling vat for preferably less than one minute. The sheet strip thickness is usually less than 0.1 inch and preferably less than 0.03 inch so that the sheet strip can be properly guided through the continuous process, i.e. unroll the strip material and roll up the coated strip material.

Once the metal material has been aggressively pickled, the metal material may further be treated in a chemical activation process. The chemical activation process further removes oxides and foreign material from the metal material by subjecting the metal material surface to a deoxidizing agent. Due to the difficulty in removing oxides from stainless steel materials, a stainless steel material should be treated in the chemical activation process after the stainless steel material has been treated in the aggressive pickling process. Various types of deoxidizing solutions can be used. For the treatment of a stainless steel material, zinc chloride has been found to be an excellent deoxidizing solution.

The zinc chloride acts as both a deoxidizer and a protective coating for the metal material surface. The temperature of the zinc chloride solution is generally kept at ambient temperature (60°–90° F.) and may be agitated to maintain a uniform solution concentration. Small amounts of hydrochloric acid may also be added to the deoxidizing solution to further enhance oxide removal. Preferably, hydrochloric acid is added to the zinc chloride when treating a stainless steel material. The time the metal material is subjected to the deoxidizing solution is usually less than 10 minutes. If the metal material is in sheet strip form and is being processed in a continuous process, the deoxidization solution tanks are preferably 25 feet in length and the metal material is subjected to the deoxidation solution for preferably less than one minute.

The pretreatment process may also include the maintaining of a low oxygen environment prior to and/or subsequent to subjecting the metal material to the aggressive pickling process and/or chemical activation process. The maintenance of a low oxygen environment inhibits the formation and/or reformation of oxides on the metal material surface. The low oxygen environment may take on several forms. Two examples of low oxygen environments are the formation of a low oxygen-containing gas environment about the metal material or the immersion of the metal material in a low oxygen-containing liquid environment. Both these environments act as shields against atmospheric oxygen and prevent and/or inhibit oxides from forming. If the metal material is stainless steel, the low oxygen environment should be maintained throughout the pretreatment process of the stainless steel material to just prior to the coating of the stainless steel material with the tin-zinc coating. The non-oxidized surface of a stainless steel material is highly susceptible to rapid reoxidation when in contact with oxygen. By creating a low oxygen environment about the stainless steel material, new oxide formation is inhibited and/or prevented.

Examples of low oxygen gas environments include nitrogen, hydrocarbons, hydrogen, noble gasses and/or other non-oxidizing gasses. Generally, nitrogen gas is used to form the low oxygen gas environment. Examples of low oxygen liquid environment include non-oxidizing liquids and/or liquids containing a low dissolved oxygen content. An example of the latter is heated water sprayed on the surfaces of the metal material; however, the metal material may also be immersed in the heated water. Heated water contains very low levels of dissolved oxygen and acts as a shield against oxygen from forming oxides with the metal material. The spray action of the heated water may also be used to remove any remaining pickling solution or deoxidizing solution from the metal material. Generally, the temperature of the heated water is maintained above 100° F. and typically about 110° F. or greater so as to exclude the unwanted dissolved oxygen.

In accordance with yet another aspect of the present invention, the tin-zinc coating is applied to the metal material by a hot-dip process. The hot-dip process is designed to be used in a batch or a continuous process. Preferably, the coating of the metal materials is by a continuous hot dip process similar to the one disclosed in Assignee's U.S. patent application Ser. No. 000,101. The metal material is coated in the hot-dip process by passing the metal material through a coating vat which contains the molten tin-zinc alloy. The coating vat may include a flux box whereby the metal material passes through the flux box and into the molten tin-zinc alloy. The flux box typically contains a flux which has a lower specific gravity than the molten tin-zinc, thus the flux floats on the surface of the molten tin-zinc the flux within the flux box acts as the final surface treatment of the metal material. The flux removes residual oxides from the metal material surface, shields the metal material surface from oxygen until the metal material is coated with the tin-zinc alloy, inhibits the formation of viscous oxides at the point where the metal material enters the molten tin-zinc alloy and inhibits dross formation on the metal material. The flux preferably contains zinc chloride and may contain ammonium chloride. The flux solution typically contains approximately 30–60 weight percent zinc chloride and up to about 40 weight percent ammonium chloride and preferably 50% zinc chloride and 8% ammonium chloride; however, the concentrations of the two flux agents may be varied accordingly.

Once the metal material passes through the flux, the metal material enters the molten tin-zinc alloy. The temperature of the molten tin-zinc is at least 449° F. The tin-zinc alloy must be maintained above its melting point or improper coating will occur. Tin melts at 232° C. (450° F.) and zinc melts at 420° C. (788° F.). The larger the content of zinc, the closer the melting point of the tin-zinc coating approaches 420° C. Metals such as iron, nickel, aluminum, titanium, copper, magnesium, bismuth and antimony which may be added to the tin-zinc alloy can also raise the melting point of the alloy. For instance, the alloy is heated to temperatures as high as 538° C. (1000° F.) when copper is added to the tin-zinc alloy. In order to accommodate for the temperatures, the coating vat is made to withstand these higher temperatures. A protective material such as palm oil is preferably placed over the surface of the molten alloy. The protective material has a specific gravity which is less than the molten alloy so that the protective materials float on the surface of the molten alloy. The protective material shields the molten alloy from the atmosphere thereby preventing oxides from forming on the molten alloy surface. The protective material also inhibits dross formation on the coated material as the coated material exits from the coating vat. If the protective material is palm oil, the melting point of the alloy must be below the 650° F. degrading point for the palm oil. For coating alloys having higher melting point temperatures, special oils, fluxes, or other materials and/or special cooling procedures for the palm oil will be employed.

The time period for applying a tin-zinc coating to the metal material is usually less than 10 minutes. If the metal material is in sheet strip form and is being processed in a continuous process, the time period for applying the tin-zinc coating is typically less than two minutes and usually from 10 to 30 seconds.

After the metal material has been coated, the coated metal material is usually cooled. The cooling of the coated metal material can be accomplished by spraying the coated metal material with a cooling fluid such as ambient temperature water and/or immersing the coated metal material in a cooling liquid such as ambient temperature water. The cooling of the coated metal material usually is less than one hour and preferably is less than a few minutes.

The thickness of the tin-zinc coating is preferably regulated by coating rollers. The thickness of the tin-zinc coating is typically 0.0003–0.05 inch. Spray jets which spray the molten tin-zinc alloy onto the metal material may be used to ensure a uniform and continuous coating on the metal material. The continuous hot-dip process disclosed in Ser. No. 000,101 can be used to coat architectural materials made of metals such as stainless steel, carbon steel, aluminum, copper, titanium and bronze.

In accordance with another aspect of the invention, bismuth, antimony, nickel, aluminum, titanium, copper and/or magnesium may be added to the tin-zinc coating to enhance the physical properties of the tin-zinc alloy, improve corrosion resistance, improve grain refinement, inhibit oxidation of the molten alloy, inhibit dross formation during coating, and/or inhibit the crystallization of the tin. When tin crystallizes, the bonding of the tin-zinc coating to the metal materials may weaken resulting in flaking of the coating. The addition of small amounts of bismuth and/or antimony in an amount of at least 0.05 weight percent prevents and/or inhibits the crystallization of the tin. Bismuth and/or antimony also enhances the hardness, strength mechanical properties and corrosion resistance of the tin-zinc coating. Nickel has been found to provide additional corrosion protection to the tin-zinc alloy especially in alcohol containing environments. Copper is added, in addition to its stabilizing properties, as a coloring agent to reduce the reflective properties of the newly applied alloy and/or to obtain the desired coloring of the weathered coating. Copper also improves the corrosion resistance of the tin-zinc alloy especially in marine environments. Magnesium has been found to improve the flow or coating properties of the tin-zinc alloy so that more uniform coating is applied to the metal material. Magnesium also reduces the anodic characteristics of the coating to further increase the corrosion resistance of the coating. The magnesium may also reduce oxidation of the molten alloy and/or reduce dross formation during coating. Aluminum is added to the alloy to inhibit oxidation of the molten alloy and to reduce dross formation on the coating. Aluminum also reduces the thickness of the intermetallic Fe-Zn layer so as to improve the formability of the coated metal material. Titanium is added to the alloy to improve the grain refinement of the coated alloy and hardness and strength of the alloy. Titanium also prevents oxidation of the molten alloy and helps reduce dross formation.

In accordance with another feature of the present invention, the tin-zinc coating is essentially lead free. The lead content is maintained at extremely low levels not exceeding 0.05 weight percent. Preferably, the lead content is maintained at much lower weight percentage levels so as to dispense with any environmental concerns associated with the tin-zinc coating.

In accordance with yet another feature of the present invention, the tin-zinc coating composition is such that the coated materials can be formed on site without the tin-zinc coating cracking and/or flaking off. The amount of zinc in the tin-zinc coating is controlled such that the coating does not become too rigid and brittle.

In accordance with still another aspect of the present invention, the metal material is plated with a nickel barrier prior to applying the tin-zinc coating to provide additional corrosion resistance, especially against halogens such as chlorine. The nickel barrier is applied to the metal materials to form a thin layer. Although the tin-zinc coating provides excellent protection against most of these corrosion-producing elements and compounds, compounds such as chlorine have the ability to sometimes penetrate the tin-zinc coating and attack and oxidize the surface of the metal materials thereby weakening the bond between the metal material and the tin-zinc coating. The nickel barrier has been found to provide an almost impenetrable barrier to these elements and/or compounds which in fact penetrate the tin-zinc coating. Due to the very small amount of these compounds penetrating the tin-zinc coating, the thickness of the nickel barrier can be maintained at thin thicknesses while still maintaining the ability to prevent these components from attacking the metal material. The tin-zinc coating and thin nickel coating effectively complement one another to provide superior corrosion resistance.

In accordance with an aspect of this invention, the metal strip is provided in a large coil, passed through a preplating bath generally without preheating and then moved continuously as a continuous moving strip through the bath containing a coating alloy of zinc and tin with tin being at least a sufficient amount to overcome the galvanizing of the strip. The zinc tin alloy is not merely zinc with a small amount of tin to trim the galvanizing of the moving strip. It is common practice to continuously galvanize moving strip. This invention is different in that the bath contains a major amount of tin to change the galvanizing properties and appearance of the strip. The coated strip is then recoiled for shipment and use in mass production of products, such as gasoline tanks for motor vehicles. Without changing the coating ease of the two phase alloy including zinc and a major amount of tin, i.e. at least about 20% tin, the alloy may include copper of about 1%, but preferably not more than about 2.7% by weight of coating material.

Thus, a preferred embodiment is a zinc-tin coating alloy with copper up to 2.7%. This coating material increases corrosion-resistance, especially in marine environments. The copper is added as brass.

Another improvement to the zinc-tin alloy with copper is the further inclusion of small controlled amounts of aluminum. Typically, the aluminum content is up to 0.5% and preferably about 0.3%. This preferred embodiment is a two-phase zinc-tin coating alloy with copper and up to 0.5% aluminum. The aluminum is added as an alloy of aluminum, copper and magnesium.

It has been found that titanium prevents oxidation and improves the grain refinement of the zinc-tin coating alloy. Preferably, up to 0.15% titanium can be used. This preferred embodiment includes the novel two-phase zinc-tin alloy with titanium up to about 0.15%.

Antimony improves corrosion-resistance of the two-phase zinc-tin coating alloy. In a preferred embodiment, the coating material is the zinc-tin alloy with antimony up to 5.5%, and preferably about 1.0%.

As an example of a coating material of the invention, the material has a base of the zinc-tin alloy with:

| | |
|---|---|
| Copper up to: | 2.7% |
| Aluminum up to: | 0.5% |
| Titanium up to: | 0.15% |
| Antimony up to: | 5.5% |

As another example, the zinc-tin alloy has:

| |
|---|
| About 1.0% copper |
| About 0.3% aluminum |
| About 1.0% antimony |

The alloy and additions above have further examples adding bismuth up to 1.7%; magnesium up to 0.4% and nickel up to 1.0%. Further, the basic coating alloy with additives can be coated on a moving strip with a flash of nickel to improve corrosion.

The strip is preferably steel strip of less than about 0.10 inches (preferably less than about 0.03 inches) and the coating is greater than about 0.0003 inches and preferably 0.001–0.002 inches. The strip must be continuously moving to give uniformity of coating, ability to airknife and to provide any commercial success of the product. The invention is a two-phase alloy, not zinc with a minor additive of tin, copper, titanium, aluminum, antimony, etc. The tin modifies the zinc, as used in galvanizing, to achieve a non-galvanized continuous coating.

The primary object of the present invention is the provision of an architectural material coated with a metallic coating which is highly corrosive resistant.

Another object of the present invention is the provision of an architectural material treated with a metallic coating that is not highly reflective.

Yet another object of the present invention is a metallic coating, as defined above, which is a two phase system comprised of tin and zinc.

Still another object of the present invention is the provision of an architectural material having a tin-zinc coating which weathers to a grey, earth tone color.

Yet another object of the present invention is the provision of a roofing material having a tin-zinc metallic coating which is essentially lead free.

Still yet another object of the present invention is to provide a two phase, tin-zinc metallic coating applied to a base metal sheet which coated sheet can be formed and sheared to form various building and roofing components that can be subsequently assembled on site without the metallic coating flaking off, chipping, and/or cracking.

Still another object of the present invention is the provision of providing a tin-zinc coated material which can be preformed into roof pans and subsequently seamed on site either by pressed seams or soldered seams into waterproof joints.

Another object of the present invention is the provision of applying a thin nickel barrier to the surface of the metal material prior to applying the tin-zinc coating.

Yet another object of the present invention is the provision of coating an architectural material by a continuous, hot-dipped process.

Still yet another object of the present invention is the addition of nickel to the tin-zinc alloy to increase the corrosion resistance and other physical properties of the alloy.

Another object of the present invention is the addition of a coloring agent to the tin-zinc alloy to dull the color of the alloy.

Yet another object of the present invention is the addition of magnesium to the tin-zinc alloy to improve the flow characteristics and corrosion resistance of the alloy.

Another object of the present invention is the addition of titanium to the tin-zinc alloy to positively affect grain refinement in the coated alloy.

Yet another object of the present invention is the addition of titanium to the .tin-zinc alloy to reduce oxidation of the molten tin-zinc alloy.

Still yet another object of the present invention is the addition of aluminum to the tin-zinc alloy to reduce oxidation of the molten tin-zinc alloy.

These and other objects and advantages will become apparent to those skilled in the art upon reading of the detailed description of the invention set forth below.

DESCRIPTION OF THE PREFERRED EMBODIMENT

The tin-zinc coating is a two phase metallic coating which, when applied to stainless steel, low carbon steel or copper material, forms a highly corrosion-resistant coating that reduces the corrosion of the metal materials when exposed to the atmosphere. The tin-zinc coating contains a large weight percentage of zinc and tin. It has been discovered that by adding zinc in the amounts of at least 7 weight percent of the tin-zinc alloy and over 9 weight percent for a two-phase alloy, the corrosion resistance of the two phase metallic coating is significantly increased as compared to a protective coating essentially composed of tin. Historically, it was believed that two phase systems provided less corrosion resistance protection than single phase systems. This belief was partially derived from the fact that the bonding between different types of metals is irregular and sometimes weaker, thus making the coating more susceptible to corrosion. Although the exact reasons for this physical phenomenon of increased corrosion resistance due to the combination of zinc and tin is unknown to the inventors, it has been found that by adding zinc to tin, the two phase metallic coating exhibits corrosive-resistant properties which exceed that of tin coatings, zinc coatings and, in some environments, that of a terne coating.

The tin content of the alloy is preferably at least 15 weight percent of the alloy. The zinc content of the alloy is preferably at least 20 weight percent of the alloy. The tin plus zinc content of the tin-zinc alloy is typically at least about 80 weight percent and preferably at least about 90 weight percent and can make up about 100 weight percent.

The tin-zinc coating is electroprotective under oxidizing conditions which inhibits oxidation of exposed metal near the tin-zinc coating. As a result, minor discontinuities in the tin-zinc coating do not result in oxidation of the exposed metal, a contrary result if only a tin coating is used.

The tin-zinc coating may contain other metals to modify the physical properties of the tin-zinc, two phase metallic coating to contribute to the strength of the coating, to the corrosion-resistant properties of the coating, the color of the coating, the stability of the coating and the coating properties of the coating. The tin-zinc coating can be applied to stainless steel, carbon steel and copper materials by preferably using a continuous, hot-dip process; however, the coating may be applied by other means such as by electroplating, an airknife process, etc. The tin-zinc coating is not limited to only the protection of stainless steel, carbon steel and copper and may also be applied to other metals such as bronze, tin, titanium, etc. Prior to Applicants invention, a two phase metallic tin-zinc coating has not been previously used, especially on architectural materials such as metallic building and roofing materials. The bonding of the tin-zinc coating to carbon steel, stainless steel and copper materials is surprisingly strong and forms a durable protective coating which is not easily removable, thereby resisting flaking of the coating.

The surface of the metal material is preferably pretreated prior to applying the tin-zinc coating to improve the bonding between the tin-zinc coating and the surface of the metal material. For stainless steel materials, a pretreatment process should be used which includes aggressively pickling and chemically activating the surface of the stainless steel to activate the surface thereby providing a significantly stronger bonding of the coating. Preferably, the pretreatment process disclosed in Assignees' application Ser. No. 000,101 is used.

The life of the coated metal material is significantly extended by coating the material with the tin-zinc metallic coating. The tin-zinc coating acts as a barrier to the atmosphere which prevents the metal material from oxidizing and/or reducing in the presence of oxygen, carbon dioxide, alcohols, halogens or other reducing agents in the environment. Although the tin-zinc coating oxidizes in the presence of various reducing agents in the atmosphere, the rate of oxidation is significantly slower than that of the architectural materials. Furthermore, the tin and zinc oxide which forms on the coating surface provides corrosion resistance to the tin-zinc coating itself which further enhances the corrosion protection provided by the tin-zinc coating.

The tin-zinc oxides also reduce the reflectivity of the tin-zinc coating and color the tin-zinc coating. Terne coated materials have become very popular since terne coated materials eventually weather and turn a grey, earth tone color. The inventors discovered that the novel tin-zinc formulations form a colored coating which closely matches the popular grey, earth tone color of weathered terne. Furthermore, by coating the building materials with the tin-zinc coating, the usable life of the materials is extended typically beyond the life of the structure the coated materials are used on due to the corrosion-resistance of the tin-zinc coating.

The tin-zinc coating is primarily composed of tin and zinc and contains little, if any, lead thus making the coating essentially lead free and environmentally friendly. The lead content, if any, is maintained at extremely low levels within the metallic coating. The amount of lead in the tin-zinc coating is maintained such that no more than 0.05 weight percent is present in the coating. Preferably, the lead content in the coating is maintained at levels less than 0.01 weight percent. The limiting of lead content in the metallic coating eliminates any concerns associated with the leaching of the lead from the metallic coating and the environmental concerns associated with products containing lead.

The tin-zinc metallic coating is a two phase system which contains a large weight percentage of tin and zinc. Preferably, the zinc weight percentage is at least 7% and over 9% for a two-phase alloy and can be as much as 85% of the tin-zinc coating. The tin content within the metallic coating essentially makes up the balance of the metallic coating. The tin content of the tin-zinc alloy can be from 15–93% of the alloy. Preferably, the tin content of the alloy is at least 20 weight percent of the alloy. The tin plus zinc content in the alloy is 75 weight percent or more, and preferably at least 80 weight percent and more preferably 90 weight percent. The coating may contain up to 95 to 100 weight percent tin and zinc. The tin-zinc system forms a two phase metallic coating. A two phase system is defined as a metal alloy comprising two primary components, i.e. tin and zinc. Surprisingly, the inventors have found that the tin-zinc coating provides a protective coating with a higher corrosion resistance as compared to a tin coating primarily made up of tin. The amount of zinc within the metallic coating is maintained so as not to exceed 85% so that the metallic coating remains relatively pliable. Preferably, the zinc content of the alloy does not exceed 80 weight percent.

The inventors have discovered that the use of large weight percentages of zinc in the tin-zinc alloy does not cause the coating to become too rigid or brittle thus preventing the coated material to be formed or bent which results in a cracked coating. Extensive experimentation was performed on tin-zinc coatings having a zinc content from 7 to 85 weight percent. Surprisingly, it was discovered that a tin-zinc coating containing 7–85 weight percent zinc and essentially the balance tin produced an acceptably malleable to be malleable. In addition to the surprising malleability of the tin-zinc coating, it was discovered that the coating provides comparable and/or superior corrosion resistance to tin, zinc or terne coatings.

It was also discovered that the tin-zinc coating containing 7–85 weight percent zinc produced a colored coating which can closely matched the gray, earth tone color of weathered terne. Besides terne coatings providing corrosion resistance, terne weathers over time and changes color to a gray, earth tone color. This color has become very popular with consumers; however, the color has been almost impossible until now to match unless the material was painted. The inventors have discovered that the high zinc tin-zinc coating changes to a color which very closely resembles the popular grey, earth tone color.

The inventors have found that tin-zinc coatings containing 7–85 weight percent zinc can be coated by a hot-dip coating process. Tin-zinc coatings which contain a high zinc content and/or metal additives can cause the alloy to melt at a higher temperature and may require minor modifications to a hot-dip process. Such modification may include 1) obtaining a coating vat that can handle higher temperatures, and 2) a protective material, which floats on the molten alloy to prevent oxidation of the molten alloy surface and dross formation on the coated metal material, that will not degrade at higher temperatures.

The tin-zinc coating may contain nickel to increase the corrosion resistance of the coating. The nickel in the coating has been found to increase the corrosion resistance of the tin-zinc coating especially in alcohol and halogen containing environments. The nickel addition to the tin-zinc alloy may also positively affect other physical properties of the tin-zinc alloy such as act as a metallic stabilizer, resist viscous oxide formation of the molten tin-zinc alloy contained in the coating vat, and/or reduce dross formation on the coated metal material. The nickel content of the tin-zinc coating preferably does not exceed 5.0 weight percent. Larger nickel concentrations can make the coated materials difficult to form. Typically, the nickel content does not exceed 1.0 weight percent and is preferably 0.3–0.9 weight percent and more preferably about 0.7 weight percent.

A coloring agent may be added to the tin-zinc alloy to affect the color and reflectivity of the coated metal material. Copper metal has been found to be an effective coloring agent to reduce the reflectiveness of the newly applied tin-zinc coating by dulling the color of the tin-zinc coating. The addition of copper to the alloy also improve the corrosion-resistance of the alloy, especially in marine environments. The copper addition to the tin-zinc alloy may also positively affect other physical properties of the tin-zinc alloy such as act as a metallic stabilizer for the tin and/or zinc in the alloy, increase the pliability of the tin-zinc alloy, resist viscous oxide formation of the molten tin-zinc alloy contained in the coating vat, and/or reduce dross formation on the coated metal material. The copper content can be added up to 5 weight percent of the two-phase tin-zinc alloy. Preferably, the copper content of the alloy does not exceed 2.7 weight percent of the alloy. If copper is added to the alloy, copper content is usually added in amounts from 0.1 to 1.6 weight percent and preferably from 1.0 to 1.5 weight percent. Copper is preferably added to the molten alloy in the form of brass.

Magnesium can be added to the tin-zinc alloy to improve the corrosion resistance of the tin-zinc alloy. The tin-zinc alloy has anodic characteristics which can attract negatively charged components such as oxygen, alcohols and halogens. These negatively charged components eventually react with the tin-zinc alloy which, in turn, causes the alloy to corrode. It has been found that the addition of magnesium to the tin-zinc alloy reduces the anodic characteristics of the alloy thus increasing the corrosion resistance of the alloy. The addition of magnesium also improves the flowability or viscous qualities of the molten alloy to improve the ease of applying the coating and uniformity of the coating. The addition of magnesium to the molten tin-zinc alloy further reduces or eliminates the need of using a flux in the coating process. The magnesium content does not exceed 5.0 weight percent of the alloy. The magnesium is preferably not more than about 1.0 weight percent of the alloy and more preferably, 0.01–0.4 weight percent of the alloy. When only magnesium is added to the molten alloy, it is preferably added as pure magnesium.

The tin-zinc alloy may contain titanium. Titanium has been found to positively affect the grain refinement of the coated tin-zinc alloy to improve the bonding of the tin-zinc alloy to the metal material. A small grain size of the alloy has been found to form a stronger bond to the metal materials. Titanium in the alloy facilitates in the formation of a smaller grain size of the alloy. Titanium has also been found to reduce oxidation of the molten alloy and to reduce dross formation. The titanium content of the alloy preferably does not exceed 1.0 weight percent of the alloy. Preferably, the titanium content of the alloy is from 0.01–0.5%, and more preferably 0.01–0.15% of the alloy. If titanium is added to the molten tin-zinc alloy, the titanium is preferably added in the form of a Zn-Ti alloy.

Aluminum can be added to the tin-zinc alloy. Aluminum has been found to reduce oxidation of the molten alloy and to reduce dross formation. The aluminum also improves the bonding of the tin-zinc alloy to the metal material. The addition of aluminum reduces the formation of a Fe-Zn intermetallic layer thus improving the formability of ferrous metal coated materials. Aluminum further increases the luster of the coated tin-zinc alloy. In order to dull the color and reflectivity of the tin-zinc coating containing aluminum, a coloring and dulling agent such as copper should be added to the tin-zinc alloy when aluminum is added to the alloy. The amount of aluminum added to the alloy preferably does not exceed 5.0 weight percent of the alloy. Preferably, the aluminum content of the alloy is 0.01–1.0 weight percent, more preferably 0.01–0.5 weight percent and even more preferably 0.01–0.3 weight percent. If aluminum is added to the alloy, it is preferably added to the molten tin-zinc as an alloy of Al-Cu-Mg.

The tin-zinc metallic coating may also contain small amounts of other metallic components which can be used to slightly modify the physical properties of the metallic coating. The metallic coating may contain bismuth and antimony to increase the strength of the metallic coating and also to inhibit the crystallization of the tin at lower temperatures. The amount of bismuth in the metallic coating may range between 0–1.7 weight percent and the amount of antimony may range between 0–5.5 weight percent of the coating. Preferably, antimony and/or bismuth are added to the metallic coating in an amount between 0.05–0.5 weight percent of the coating. This weight percentage amount is sufficient to prevent the tin from crystallizing at low temperatures which may result in the metallic coating flaking off the metal materials. It is believed that the high levels of zinc also help stabilize the tin within the coating. Antimony also improves the corrosion-resistance of the alloy. The addition of bismuth improves the mechanical properties of the alloy such as pliability, hardness and strength of the alloy.

Small amounts of other metals, such as iron, may be added to the metallic coating to strengthen and/or positively affect other physical properties of the tin-zinc alloy. If iron is added to the tin-zinc coating, the iron content preferably does not exceed 0.1 weight percent of the alloy. These other types of metals typically constitute very small weight percentages within the metallic coating and generally do not exceed more than 2% of the tin-zinc coating and preferably are less than 1% of the tin-zinc coating.

The tin-zinc coating forms a grey, earth tone color which closely resembles the color associated with weathered terne coatings. The grey surface is much less reflective than that of coatings of tin and/or non-weathered terne. The reduced reflective surface of the tin-zinc coating is important in that the coated building materials can be immediately used on facilities that require materials not to be highly reflective. Prior coatings such as tin and/or terne had to be weathered and/or additionally treated before such coated building materials could be used on facilities which prohibit the use of highly-reflective materials. The tin-zinc alloy weathers and colors quicker than terne or tin coatings.

The tin-zinc coating can be applied to many types of metal materials. Preferably, the metal materials are carbon steel, stainless steel and copper. These metal materials are preferably pre-treated before coating to clean the material surface and remove oxides from the surface so that a strong bond is formed between the metal material and the tin-zinc coating.

The inventors have also discovered that if the metal material is plated with a thin nickel layer prior to coating the metal material with the tin-zinc coating, the metal material exhibits improved corrosion resistance in acidic and/or halogenic environments. If a nickel layer is to be applied, the nickel layer is preferably plated to the metal material by an electrolysis process. The thickness of the layer is maintained such that it preferably is not more than 3 microns ($1.18 \times 10^{-4}$ in) thick and preferably has a thickness which ranges between 1–3 microns. The bond between the tin-zinc coating and the nickel layer is surprisingly strong and durable and thereby inhibits the tin-zinc coating from flaking especially when the metal materials are preformed or formed during installation. The plating of the metal materials with the nickel layer is very desirable when the metal materials are used in an environment which has high concentrations of fluorine, chlorine and other halogens. Although the tin-zinc coating significantly reduces the corrosive effects of halogens on the metal materials, it has been found that by placing a thin layer of plated nickel between the metal material and the tin-zinc coating, the corrosive effects of the halogens are even further reduced.

The general formulation of the invention is as follows:

| | |
|---|---|
| Tin | 20–93 |
| Zinc | 7–80 |
| Magnesium | 0.0–5 |
| Nickel | 0.0–5 |
| Copper | 0.0–5 |
| Titanium | 0.0–1.0 |
| Aluminum | 0.0–5.0 |
| Antimony | 0.0–5.5 |
| Bismuth | 0.0–1.7 |
| Iron | 0.0–0.1 |
| Lead | 0.0–0.05 |

A few examples of the tin-zinc, two-phase metallic coating which have exhibited the desired characteristics as mentioned above are set forth as follows:

| Alloy Ingredients | A | B | C | D | E |
|---|---|---|---|---|---|
| Tin | 20 | 25 | 50 | 60 | 75 |
| Magnesium | <1.0 | <1.0 | <1.0 | <1.0 | <1.0 |
| Nickel | ≦1.0 | ≦1.0 | ≦1.0 | ≦1.0 | ≦1.0 |
| Copper | ≦2.7 | ≦2.7 | ≦2.7 | ≦2.7 | ≦2.7 |
| Titanium | <0.5 | <0.5 | <0.5 | <0.5 | <0.5 |
| Aluminum | <1.0 | <1.0 | <1.0 | <1.0 | <1.0 |
| Antimony | ≦5.5 | ≦5.5 | ≦5.5 | ≦5.5 | ≦5.5 |
| Bismuth | ≦1.7 | ≦1.7 | ≦1.7 | ≦1.7 | ≦1.7 |
| Iron | ≦0.1 | ≦0.1 | ≦0.1 | ≦0.1 | ≦0.1 |
| Lead | <0.05 | <0.05 | <0.05 | <0.05 | <0.05 |

Typically, the formulations of the tin-zinc metallic coating includes: 20–80% zinc; 20–80% tin; 0.0–0.4% magnesium; 0.0–1.0% nickel; 0.0–2.7% copper; 0.0–0.15% titanium; 0.0–0.5% aluminum; 0.0–5.5 antimony; 0.0–1.5% bismuth; up to 0.1% iron and less than 0.01% lead; and preferably 30–65% zinc; 35–70% tin; 0.0–0.4% magnesium; 0.0–0.7% nickel; 0.0–1.0% copper; 0.0–0.15% titanium; 0.0–0.3% aluminum; 0.05–1.0% bismuth and/or antimony; less than 0.1% iron; less than 0.01% lead; and the tin plus zinc content is at least 90% of the coating.

The thickness of the tin-zinc coating may be varied depending upon the environment in which the metal materials are to be used. The tin-zinc coating exhibits superior corrosive-resistant properties as compared to tin coatings. The metallic coating may be applied in a thickness between 0.0003–0.05 in. Preferably, the coating thickness is applied by a continuous hot-dip process and ranges between 0.001–0.002 in. Such a coating thickness has been found to be adequate to prevent and/or significantly reduce the corrosion of the metal materials in virtually all types of environments. Coatings having thicknesses greater than 0.002 can be used in harsh environments to provide added corrosion protection.

The tin-zinc coating can be welded with standard lead solders and no-lead solders. Preferably, no-lead solders are used to avoid concerns associated with the use of lead.

The invention has been described with reference to the preferred and alternate embodiments. Modifications and alterations will become apparent to those skilled in the art upon the reading and understanding of the details discussed in the detailed discussion of the invention provided for herein. This invention is intended to include all such modifications and alterations insofar as they come within the scope of the present invention.

Having defined the invention, the following is claimed:

1. A coated metal strip including a base metal strip selected from the group consisting of carbon steel, stainless steel and copper, said base metal strip having parallel surfaces both of which are coated in a continuous, hot-dip process by continuously passing the continuous base metal strip through a bath of molten tin-zinc alloy at an essentially constant speed to deposit onto said base strip an impervious low reflecting, corrosive-resistant, two-phase layer of said tin-zinc alloy, said two-phase tin-zinc layer comprising tin, at least about 20 weight percent zinc and an effective amount of a metal stabilizer selected from the group consisting of copper, antimony, bismuth and mixtures thereof, said two-phase tin-zinc layer having a tin plus a zinc content at least 75 weight percent of said layer.

2. A coated metal strip as defined in claim 1, wherein said coating comprises:

| | |
|---|---|
| Tin | [20–93] 20–80 |
| Zinc | [7–80] 20–80 |

-continued

| | |
|---|---|
| Magnesium | 0.0–5.0 |
| Nickel | 0.0–5.0 |
| Copper | 0.0–5.0 |
| Titanium | 0.0–1.0 |
| Aluminum | 0.0–5.0 |
| Antimony | 0.0–5.5 |
| Bismuth | 0.0–1.5. |

3. A coated metal strip as defined in claim 2, wherein said tin-zinc coating comprises:

| | |
|---|---|
| Tin | [20–93] 20–80 |
| Zinc | [7–80] 20–80 |
| Magnesium | ≦0.4 |
| Nickel | ≦1.0 |
| Copper | ≦2.7 |
| Aluminum | ≦0.5 |
| Titanium | ≦0.15 |
| Antimony | ≦5.5 |
| Bismuth | ≦1.7. |

4. A coated metal strip as defined in claim 3, wherein said tin-zinc coating comprises:

| | |
|---|---|
| Tin | [20–93] 20–80 |
| Zinc | [7–80] 20–80 |
| Magnesium | ≦0.4 |
| Nickel | ≦0.7 |
| Copper | ≦1.0 |
| Aluminum | ≦0.3 |
| Titanium | ≦0.15 |
| Antimony | ≦1.0 |
| Bismuth | ≦1.7. |

5. A coated metal strip as defined in claim 1, wherein the thickness of said tin-zinc coating is at least 0.0003 inch.

6. A coated metal strip as defined in claim 1, wherein the lead content of said tin-zinc coating is not more than 0.01 weight percent.

7. A coated metal strip as defined in claim 1, wherein a nickel layer is applied to said metal material prior to applying said tin-zinc coating.

8. A coated metal strip as defined in claim 1, wherein said tin-zinc coating includes magnesium.

9. A coated metal strip as defined in claim 8, wherein said tin-zinc coating includes aluminum.

10. A coated metal strip defined in claim 8, wherein said tin-zinc coating includes 0.01–1.0 weight percent titanium.

11. A coated metal strip as defined in claim 10, wherein said tin-zinc coating includes aluminum.

12. A coated metal strip as defined in claim 1, wherein said metal strip is a metal selected from the group consisting of carbon steel, stainless steel and copper.

13. A coated metal strip as defined in claim 1, wherein the content of said metallic stabilizer in said tin-zinc coating is at least 0.05 weight percent.

14. A coated metal strip as defined in claim 13, wherein the content of said bismuth in said tin-zinc coating is less than about 1.7 weight percent.

15. A coated metal strip as defined in claim 14, wherein the antimony content of said tin-zinc coating is less than about 5.5 weight percent.

16. A coated metal strip as defined in claim 13, wherein the antimony content of said tin-zinc coating is less than about 5.5 weight percent.

17. A coated metal strip as defined in claim 16, wherein said antimony content of said tin-zinc coating is about 1.0 weight percent.

18. A coated metal strip as defined in claim 1, wherein said tin-zinc coating includes titanium.

19. A coated metal strip as defined in claim 18, wherein said tin-zinc coating includes 0.01–1.0 weight percent titanium.

20. A coated metal strip as defined in claim 19, wherein said titanium content of said tin-zinc coating is 0.01 to about 0.15 weight percent.

21. A coated metal strip as defined in claim 18, wherein said tin-zinc coating includes aluminum.

22. A coated metal strip as defined in claim 1, wherein said tin-zinc coating includes aluminum.

23. A coated metal strip as defined in claim 22, wherein the aluminum content of said tin-zinc coating is at least 0.01 weight percent.

24. A coated metal strip as defined in claim 23, wherein said aluminum content of said tin-zinc coating is less than about 0.5 weight percent.

25. A coated metal strip as defined in claim 24, wherein said aluminum content of said tin-zinc coating is about 0.3 weight percent.

26. A coated metal strip including a base metal strip with parallel surfaces both of which are coated in a continuous, hot-dip process by continuously passing the continuous base metal strip through a bath of molten tin-zinc alloy at an essentially constant speed to deposit onto said base strip an impervious low reflecting, corrosive-resistant, two-phase layer of said tin-zinc alloy, said two-phase tin-zinc layer comprising tin, at least 20 weight percent zinc and a metal additive including a metal selected from the group consisting of magnesium, copper, titanium, antimony, bismuth and mixtures thereof, said two-phase tin-zinc layer having a tin plus a zinc content at least 75 weight percent of said layer, and said nickel content of said tin-zinc coating is at least 0.3 weight percent.

27. A coated metal strip as defined in claim 26, wherein said nickel content of said tin-zinc coating is 0.3–0.9 weight percent.

28. A coated metal strip as defined in claim 27, wherein said nickel content of said tin-zinc coating is about 0.7 weight percent.

29. A coated metal strip as defined in claim 26, wherein said tin-zinc coating includes copper.

30. A coated metal strip as defined in claim 29, wherein said tin-zinc coating includes 0.01–1.0 weight percent titanium.

31. A coated metal strip as defined in claim 30, wherein said tin-zinc coating includes aluminum.

32. A coated metal strip as defined in claim 26, wherein said tin-zinc coating includes magnesium.

33. A coated metal strip as defined in claim 32, wherein said tin-zinc coating includes 0.01–1.0 weight percent titanium.

34. A coated metal strip as defined in claim 33, wherein said tin-zinc coating includes aluminum.

35. A coated metal strip as defined in claim 26, wherein said lead content of said tin-zinc coating is not more than 0.01 weight percent.

36. A coated metal strip as defined in claim 35, wherein said tin-zinc coating includes 0.01–1.0 weight percent titanium.

37. A coated metal strip as defined in claim 36, wherein said tin-zinc coating includes aluminum.

38. A coated metal strip as defined in claim 26, wherein said tin-zinc coating includes a metallic stabilizer selected from the group consisting of antimony and bismuth.

39. A coated metal strip as defined in claim 38, wherein said tin-zinc coating includes 0.01–1.0 weight percent titanium.

40. A coated metal strip as defined in claim 39, wherein said tin-zinc coating includes aluminum.

41. A coated metal strip as defined in claim 26, wherein said tin-zinc coating includes titanium.

42. A coated metal strip as defined in claim 41, wherein said tin-zinc coating includes 0.01–1.0 weight percent titanium.

43. A coated metal strip as defined in claim 41, wherein said tin-zinc coating includes aluminum.

44. A coated metal strip as defined in claim 26, wherein said tin-zinc coating includes aluminum.

45. A coated metal strip including a base metal strip with parallel surfaces both of which are coated in a continuous, hot-dip process by continuously passing the continuous base metal strip through a bath of molten tin-zinc alloy at an essentially constant speed to deposit onto said base strip an impervious low reflecting, corrosive-resistant, two-phase layer of said tin-zinc alloy, said two-phase tin-zinc layer comprising tin, zinc and a metal additive including a metal selected from the group consisting of magnesium, copper, titanium, antimony, bismuth and mixtures thereof, said two-phase tin-zinc layer having a tin plus a zinc content at least 75 weight percent of said layer and said copper content of said tin-zinc coating is at least 0.1 weight percent.

46. A coated metal strip as defined in claim 45, wherein said copper content of said tin-zinc coating is 0.1–2.7 weight percent.

47. A coated metal strip as defined in claim 46, wherein said copper content of said tin-zinc coating is about 1.0 weight percent.

48. A coated metal strip as defined in claim 45, wherein said tin-zinc coating includes magnesium.

49. A coated metal strip as defined in claim 48, wherein said tin-zinc coating includes 0.01–1.0 weight percent titanium.

50. A coated metal strip as defined in claim 49, wherein said tin-zinc coating includes aluminum.

51. A coated metal strip as defined in claim 45, wherein said tin-zinc coating includes a metallic stabilizer selected from the group consisting of antimony and bismuth.

52. A coated metal strip as defined in claim 51, wherein said tin-zinc coating includes 0.01–1.0 weight percent titanium.

53. A coated metal strip as defined in claim 52, wherein said tin-zinc coating includes aluminum.

54. A coated metal strip as defined in claim 45, wherein said tin-zinc coating includes titanium.

55. A coated metal strip as defined in claim 54, wherein said tin-zinc coating includes 0.1–1.0 weight percent titanium.

56. A coated metal strip as defined in claim 54, wherein said tin-zinc coating includes aluminum.

57. A coated metal strip as defined in claim 45, wherein said tin-zinc coating includes aluminum.

58. A metal strip coated in a continuous, hot-dip process having a coating with a low reflecting, corrosive-resistant, two-phase tin-zinc metallic coating, said coating comprising tin and zinc wherein the tin plus zinc content is at least 75 weight percent of said coating, said tin-zinc coating including at least one metal selected from the group consisting of magnesium, nickel, copper, titanium, aluminum, antimony, bismuth, and mixtures thereof, wherein the magnesium content of said tin-zinc coating is at least 0.01 weight percent.

59. A coated metal strip as defined in claim 58, wherein said magnesium content of said tin-zinc coating is 0.01–1.0 weight percent.

60. A coated metal strip as defined in claim 58, wherein said tin-zinc coating includes a metallic stabilizer selected from the group consisting of antimony and bismuth.

61. A coated metal strip as defined in claim 58, wherein said tin-zinc coating includes titanium.

62. A coated metal strip as defined in claim 61, wherein said tin-zinc coating includes 0.01–1.0 weight percent titanium.

63. A coated metal strip as defined in claim 58, wherein said tin-zinc coating includes aluminum.

64. A metal strip coated in a continuous, hot-dip process having a coating with a low reflecting, corrosive-resistant, two-phase tin-zinc metallic coating, said coating comprising tin and zinc wherein the tin plus zinc content is at least 75 weight percent of said coating, said tin-zinc coating including at least one metal selected from the group consisting of magnesium, nickel, copper, titanium, aluminum, antimony, bismuth and mixtures thereof, wherein said magnesium content of said tin-zinc coating is 0.01 to about 0.4 weight percent.

65. A coated metal strip formed of a given metal, said metal strip having a thickness of less than about 0.10 inch and exposed surfaces supplied from a coil of said metal strip and coated with a highly corrosive-resistant, two-phase tin-zinc alloy by continuously passing said continuous metal strip through a molten bath of said tin-zinc coating alloy to deposit an impervious layer of said tin-zinc coating alloy having a thickness in the range of 0.0003 to 0.050 inch onto the exposed surfaces of said moving strip by a continuous hot dip procedure to produce an intermetallic interface comprising an interface multi-phase alloy constituting a heat created mixture of said given metal and said coating alloy, said interface alloy bonding said impervious layer to said exposed surfaces, said tin-zinc coating alloy including at least about 20 percent by weight tin and at least about 20 weight percent zinc wherein said tin content plus the zinc content exceeds 75 percent by weight of said coating alloy, said coating alloy also including a metal agent selected from the group consisting of an effective amount of metallic stabilizer selected from the group consisting of antimony, bismuth, copper and mixtures thereof; an effective amount of corrosion resistant additive selected from the group consisting of copper, magnesium, nickel and mixtures thereof.

66. A coated metal strip as defined in claim 65, wherein said given metal is ferrous.

67. A coated metal strip as defined in claim 65, wherein said given metal is stainless steel including chromium in said given metal.

68. A coated metal strip as defined in claim 65, wherein said given metal is copper.

69. A coated metal strip as defined in claim 65, wherein base metal is an alloy of iron with an alloying metal selected from the group consisting of chromium, nickel, carbon, molybdenum, silicon, manganese, titanium, boron, copper, aluminum and mixtures thereof.

70. A coated metal strip as defined in claim 65, wherein said coating alloy includes at least 0.1–5.0 percent by weight of copper.

71. A coated metal strip as defined in claim 65, wherein said coating alloy includes at least 0.01–5.0 percent by weight of aluminum.

72. A coated strip as defined in claim 71, wherein said two-phase coating alloy includes copper.

73. A coated strip as defined in claim 71, wherein said two-phase coating alloy includes magnesium.

74. A coated strip as defined in claim 71, wherein said two-phase coating alloy includes nickel.

75. A coated metal strip as defined in claim 65, wherein said coating alloy includes at least 0.3–5.0 percent by weight of nickel.

76. A coated metal strip as defined in claim 65, wherein said coating alloy includes 0.01–5.0 percent by weight titanium.

77. A coated metal strip as defined in claim 65, wherein said coating alloy includes at least 0.05 percent by weight of a metallic stabilizer.

78. A coated strip as in claim 65, wherein said continuously passing said continuous metal strip through a molten bath of said tin-zinc alloy has an operation line speed of less than 150 feet/minute.

79. A coated metal strip formed of a given metal, said metal strip having a thickness of less than about 0.10 inch and exposed surfaces supplied from a coil of said metal strip and coated with a highly corrosive-resistant, two-phase tin-zinc alloy by continuously passing said continuous metal strip through a molten bath of said tin-zinc coating alloy to deposit an impervious layer of said tin-zinc coating alloy having a thickness in the range of 0.0003 to 0.050 inch onto the exposed surfaces of said moving strip by a continuous hot dip procedure to produce an intermetallic interface comprising an interface multi-phase alloy constituting a heat created mixture of said given metal and said coating alloy, said interface alloy bonding said impervious layer to said exposed surfaces, said tin-zinc coating alloy including at least 15 percent by weight tin wherein said tin content plus the zinc content exceeds 75 percent by weight of said coating alloy, said tin-zinc coating alloy includes a metal selected from the group consisting of aluminum, antimony, bismuth, copper, magnesium, titanium and mixtures thereof, wherein said coating alloy includes 0.01–5.0 percent by weight magnesium.

\* \* \* \* \*

UNITED STATES PATENT AND TRADEMARK OFFICE
CERTIFICATE OF CORRECTION

PATENT NO. : 5,491,035
DATED     : Jay F. Carey, II, et. al.
INVENTOR(S): February 13, 1996

It is certified that error appears in the above-identified patent and that said Letters Patent is hereby corrected as shown below:

Title page, item [*] Notice, should read as following:
The term of this patent shall not extend beyond the expriation date of Pat. No. 5,314,758.

Signed and Sealed this

Sixth Day of April, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,491,035
DATED : February 13, 1996
INVENTOR(S) : Carey, II et al.

It is certified that error appears in the above-identified patent and that said Letters Patent is hereby corrected as shown below:

Title page,
Item [63], delete the information and substitute therefor -- Continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned.

Continuation-in-part of Ser. No. 08/341,365, Nov. 17, 1994, Pat. No. 5,489,490, which is a continuation-in-part of Ser. No. 08/260,333, Jun. 15, 1994, Pat. No. 5,429,882, which is a continuation-in-part of Ser. No. 08/209,400, Mar. 14, 1994, abandoned, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, April 5, 1993, abandoned.

Continuation-in-part of Ser. No. 08/229,097, Apr. 18, 1994, Pat. No. 5,395,702, which is a continuation of Ser. No. 08/000,101, Jan. 4, 1993, abandoned, which is a continuation-in-part of Ser. No. 07/967,407, Oct. 26, 1992, abandoned, which is a continuation-in-part of Ser. No. 07/913,209, Jul. 15, 1992, abandoned, which is a continuation-in-part of Ser. No. 07/858,662, Mar. 27, 1992, Pat. No. 5,314,758. --

Column 1,
Lines 3-8, delete and substitute therefor:

-- This patent application is continuation-in-part of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

This patent application is also a continuation-in-part of Serial No. 08/341,365 filed November 17, 1994, now Patent No. 5,489,490, which in turn is a continuation-in-part of Serial No. 08/260,333 filed June 15, 1994, now Patent No. 5,429,882, which in turn is a continuation-in-part of Serial No. 08/209,400 filed March 14, 1994, now abandoned, which in turn is a continuation-in-part of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

UNITED STATES PATENT AND TRADEMARK OFFICE
CERTIFICATE OF CORRECTION

PATENT NO.   : 5,491,035
DATED        : February 13, 1996
INVENTOR(S)  : Carey, II et al.

It is certified that error appears in the above-identified patent and that said Letters Patent is hereby corrected as shown below:

This patent application is further a continuation-in-part of Serial No. 08/229,097 filed April 18, 1994, now Patent No. 5,395,702, which in turn is a continuation of Serial No. 08/000,101 filed January 4, 1993, now abandoned, which in turn is a continuation-in-part of Serial No. 07/967,407 filed October 26, 1992, now abandoned, which in turn is a continuation-in-part of Serial No. 07/913,209 filed July 15, 1992, now abandoned, which in turn is a continuation-in-part of Serial No. 07/858,662 filed March 27, 1992, now Patent No. 5,314,758. --

Signed and Sealed this

Thirtieth Day of July, 2002

*Attest:*

*Attesting Officer*

JAMES E. ROGAN
*Director of the United States Patent and Trademark Office*

Disclaimer

5,491,035—Jay F. Carey, II, Follansbee, W. Va.; Mehrooz Zamanzadeh, Pittsburgh, Pa. COATED METAL STRIP. Patent dated February 13, 1996. Disclaimer filed June 3, 2002 by assignee, The Louis Berkman Company.

The term of this patent shall not extend beyond the expiration date of Pat. No. 5,470,667.
*(Official Gazette, August 13, 2002)*

UNITED STATES PATENT AND TRADEMARK OFFICE
CERTIFICATE OF CORRECTION

PATENT NO.   : 5,491,035
DATED        : February 13, 1996
INVENTOR(S)  : Carey, II et al.

It is certified that error appears in the above-identified patent and that said Letters Patent is hereby corrected as shown below:

<u>Title page,</u>
Item [63], substitute the following:
-- Continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned.

Continuation-in-part of Ser. No. 08/341,365, Nov. 17, 1994, Pat. No. 5,489,490, which is a continuation-in-part of Ser. No. 08/260,333, Jun. 15, 1994, Pat. No. 5,429,882, which is a continuation-in-part of Ser. No. 08/209,400, Mar. 14, 1994, abandoned, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, April 5, 1993, abandoned.

Continuation-in-part of Ser. No. 08/229,097, Apr. 18, 1994, Pat. No. 5,395,702, which is a continuation of Ser. No. 08/000,101, Jan. 4, 1993, abandoned, which is a continuation-in-part of Ser. No. 07/967,407, Oct. 26, 1992, abandoned, which is a continuation-in-part of Ser. No. 07/913,209, Jul. 15, 1992, abandoned, which is a continuation-in-part of Ser. No. 07/858,662, Mar. 27, 1992, Pat. No. 5,314,758.

Continuation-in-part of Ser. No. 08/254,875, June 6, 1994, abandoned, which is a divisional of Ser. No. 08/209,400, Mar. 14, 1994, abandoned, which is a continuation-in-part of Ser. No. 08/154,376, Nov. 17, 1993, abandoned, which is a continuation of Ser. No. 08/042,649, Apr. 5, 1993, abandoned. --

UNITED STATES PATENT AND TRADEMARK OFFICE
CERTIFICATE OF CORRECTION

PATENT NO. : 5,491,035
DATED : February 13, 1996
INVENTOR(S) : Carey, II et al.

It is certified that error appears in the above-identified patent and that said Letters Patent is hereby corrected as shown below:

<u>Column 1,</u>
Line 7, insert prior to the paragraph beginning with "The present invention relates" the following paragraph:
-- This patent application is still further a continuation-in-part of Serial No. 08/254,875 filed June 6, 1994, now abandoned, which in turn is a divisional of Serial No. 08/209,400 filed March 14, 1994, now abandoned, which in turn is a continuation-in-part of Serial No. 08/154,376 filed November 17, 1993, now abandoned, which in turn is a continuation of Serial No. 08/042,649 filed April 5, 1993, now abandoned. --

Signed and Sealed this

Thirtieth Day of September, 2003

JAMES E. ROGAN
*Director of the United States Patent and Trademark Office*